United States Patent
Suto (10) Patent No.: US 10,171,134 B2
(45) Date of Patent: Jan. 1, 2019

(54) ELECTRIC DEVICE AND OPERATION METHOD

(71) Applicant: CANON KABUSHIKI KAISHA, Tokyo (JP)

(72) Inventor: Takaya Suto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/811,974

(22) Filed: Nov. 14, 2017

(65) Prior Publication Data

US 2018/0159597 A1 Jun. 7, 2018

(30) Foreign Application Priority Data

Dec. 7, 2016 (JP) .................................. 2016-237827

(51) Int. Cl.
| | |
|---|---|
| *H04B 5/00* | (2006.01) |
| *H05B 33/08* | (2006.01) |
| *H05B 37/02* | (2006.01) |
| *H04N 1/00* | (2006.01) |

(52) U.S. Cl.
CPC ......... *H04B 5/0075* (2013.01); *H04B 5/0037* (2013.01); *H05B 33/0854* (2013.01); *H05B 37/0272* (2013.01); *H04N 1/0049* (2013.01); *H04N 1/00307* (2013.01); *H04N 2201/006* (2013.01); *H04N 2201/0094* (2013.01)

(58) Field of Classification Search
CPC ............ H02J 5/005; H02J 7/025; H02J 17/00; G06K 19/0723; H04B 5/0037; H04B 5/0075; H05B 33/0854; H05B 37/0272; H04N 1/00307; H04N 1/0049; H04N 2201/006; H04N 2201/0094

See application file for complete search history.

(56) References Cited

U.S. PATENT DOCUMENTS

| | | | | |
|---|---|---|---|---|
| 2013/0212643 | A1* | 8/2013 | Takemura | G06F 21/31 726/2 |
| 2016/0242124 | A1* | 8/2016 | Zhou | G06K 7/0008 |
| 2018/0034319 | A1* | 2/2018 | Robert | H02J 50/10 |

FOREIGN PATENT DOCUMENTS

JP            08097735            4/1996

OTHER PUBLICATIONS

Wei Xin, English translation of CN 205726561, Published Nov. 23, 2016, 2 pages.*

* cited by examiner

*Primary Examiner* — Daniel D Chang
(74) *Attorney, Agent, or Firm* — Venable LLP (57) ABSTRACT

If RF intensity is strong, an excessive voltage may be generated in an NFC IC to destroy the IC. Thus, an inexpensive arrangement for preventing the NFC IC from being destroyed is required. According to an embodiment of this invention, an electric device for performing short distance wireless communication with a mobile terminal by induced power from the mobile terminal has the following arrangement. That is, the arrangement includes an antenna configured to generate the induced power by an RF signal from the mobile terminal, an element configured to drop a peak voltage generated by the induced power, a circuit driven by the dropped voltage and configured to perform the short distance wireless communication, and a light emission element driven by the dropped voltage and configured to emit light.

16 Claims, 6 Drawing Sheets

ELECTRIC DEVICE AND OPERATION METHOD

BACKGROUND OF THE INVENTION

Field of the Invention

The present invention relates to an electric device and an operation method, and particularly to, for example, an electric device capable of performing communication by short distance wireless communication such as NFC, and an operation method for the electric device.

Description of the Related Art

As an example of a short distance wireless communication method, there is conventionally provided an NFC (Near Field Communication) technique capable of readily performing data communication within a communication range of about 10 cm. By applying this technique, it is possible to print, by a printer in which NFC is implemented, a photo or image stored in a mobile terminal such as a smartphone or tablet terminal having an NFC reader/writer function (to be referred to as an NFC R/W hereinafter) by bringing the mobile terminal closer to the printer.

In NFC, an induced current is generated in an NFC IC on a reception side by a magnetic field generated by a radio wave (to be referred to as RF hereinafter) generated by the NFC R/W to supply power. Thus, magnetic field intensity enough to generate power necessary for the operation of the IC is required.

Since, however, magnetic field intensities generated by the NFC R/Ws integrated in mobile terminals such as smartphones and tablet terminals are different, some mobile terminals generate magnetic fields stronger than that defined by the NFC standard. Therefore, a peak voltage value generated in the NFC antenna of a reception side apparatus may exceed the rating of the NFC IC, a countermeasure to suppress the peak voltage applied to the IC to the rating or less is required. To the contrary, some NFC R/Ws generate magnetic fields equal to the lower limit of the NFC standard, and thus a peak voltage value generated in the NFC antenna of a reception side apparatus may become low. To improve the RF reception sensitivity, it may be necessary to match the NFC R/W of a transmission side apparatus with the NFC antenna of a reception side apparatus.

In consideration of the above problem, there is conventionally proposed an "electromagnetic radiation detection apparatus" disclosed in, for example, Japanese Patent Laid-Open No. 8-97735. According to Japanese Patent Laid-Open No. 8-97735, it is possible to cause a current to flow into an element such as an LED by supplying power to a reception antenna by an RF signal from a transmission antenna, thereby visualizing a wireless reception state. This can cause the LED of the reception antenna to emit light by the RF signal of the transmission antenna to determine a communication state or notify the user of information indicating whether communication has been established.

Japanese Patent Laid-Open No. 8-97735 implements only a technique of supplying a current to the element such as an LED by power induced in the reception antenna by the RF signal from the transmission antenna, thereby visualizing the wireless reception state. The current is not connected to an IC of the subsequent stage of the antenna. Therefore, Japanese Patent Laid-Open No. 8-97735 does not consider protection of the IC.

However, when the reception side apparatus is supplied with power by a magnetic field generated by the NFC R/W and is driven, it is necessary to consider the connection of the IC of the subsequent stage of the reception antenna.

As described above, since the magnetic field intensities of magnetic fields generated by various mobile terminals each integrating an NFC R/W are different, the voltages of induced currents generated in the NFC antennas of reception side apparatuses are also different. Therefore, a voltage equal to or higher than that defined by the NFC standard may be generated, and a voltage equal to or higher than a tolerable level defined by the NFC standard may be applied to the IC of the reception side apparatus, thereby destroying the IC chip. Furthermore, if a voltage generated by an induced current is lower than the lower limit defined by the NFC standard, it is necessary to perform matching so that coupling between the NFC R/W of the transmission side apparatus and the NFC antenna of the reception side apparatus is strongest to establish wireless communication.

SUMMARY OF THE INVENTION

Accordingly, the present invention is conceived as a response to the above-described disadvantages of the conventional art.

For example, an electric device and an operation method according to this invention are capable of preventing, with an inexpensive arrangement, a circuit from being destroyed by induced power.

According to one aspect of the present invention, there is provided an electric device for performing short distance wireless communication with a mobile terminal by induced power from the mobile terminal, comprising: an antenna configured to generate the induced power by an RF signal from the mobile terminal; an element configured to drop a peak voltage generated by the induced power; a circuit driven by the voltage dropped by the element and configured to perform the short distance wireless communication; and a light emission element driven by the voltage dropped by the element and configured to emit light.

According to another aspect of the present invention, there is provided an operation method for an electric device including a circuit configured to perform short distance wireless communication with a mobile terminal by induced power from the mobile terminal, comprising: receiving, by an antenna, an RF signal from the mobile terminal; dropping, by an element integrated in the electric device, a peak voltage generated by induced power generated in the antenna; driving the circuit by the voltage dropped by the element to perform the short distance wireless communication; and driving a light emission element by the voltage dropped by the element to emit light.

The invention is particularly advantageous since it is possible to protect a circuit for performing short distance wireless communication even if a high voltage is generated in an antenna along with induced power.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. It should be noted that the relative arrangement of components and the like set forth in the embodiments do not limit the scope of the present invention unless it is specifically stated otherwise.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium (or sheet)" not only includes a paper sheet used in common printing apparatuses, but also broadly includes materials, such as cloth, a plastic film, a metal plate, glass, ceramics, wood, and leather, capable of accepting ink.

This embodiment will describe a case in which the user of a mobile terminal communicates with a printing apparatus using, for example, NFC as one of short distance wireless communication methods executed by induced power excited by the mobile terminal. Therefore, assume that at least the mobile terminal such as a smartphone or tablet terminal integrates an NFC reader/writer (to be referred to as an NFC R/W hereinafter) and the printing apparatus integrates an NFC IC.

In this embodiment, in consideration of the above arrangement, NFC communication control when transmitting a job to a multi-function printer (to be referred to as an MFP hereinafter) as an exemplary example of the printing apparatus using the mobile terminal will be described. Note that NFC is merely an example of short distance wireless communication, and RF-Id is one similar short distance wireless communication technique.

Figure 1:
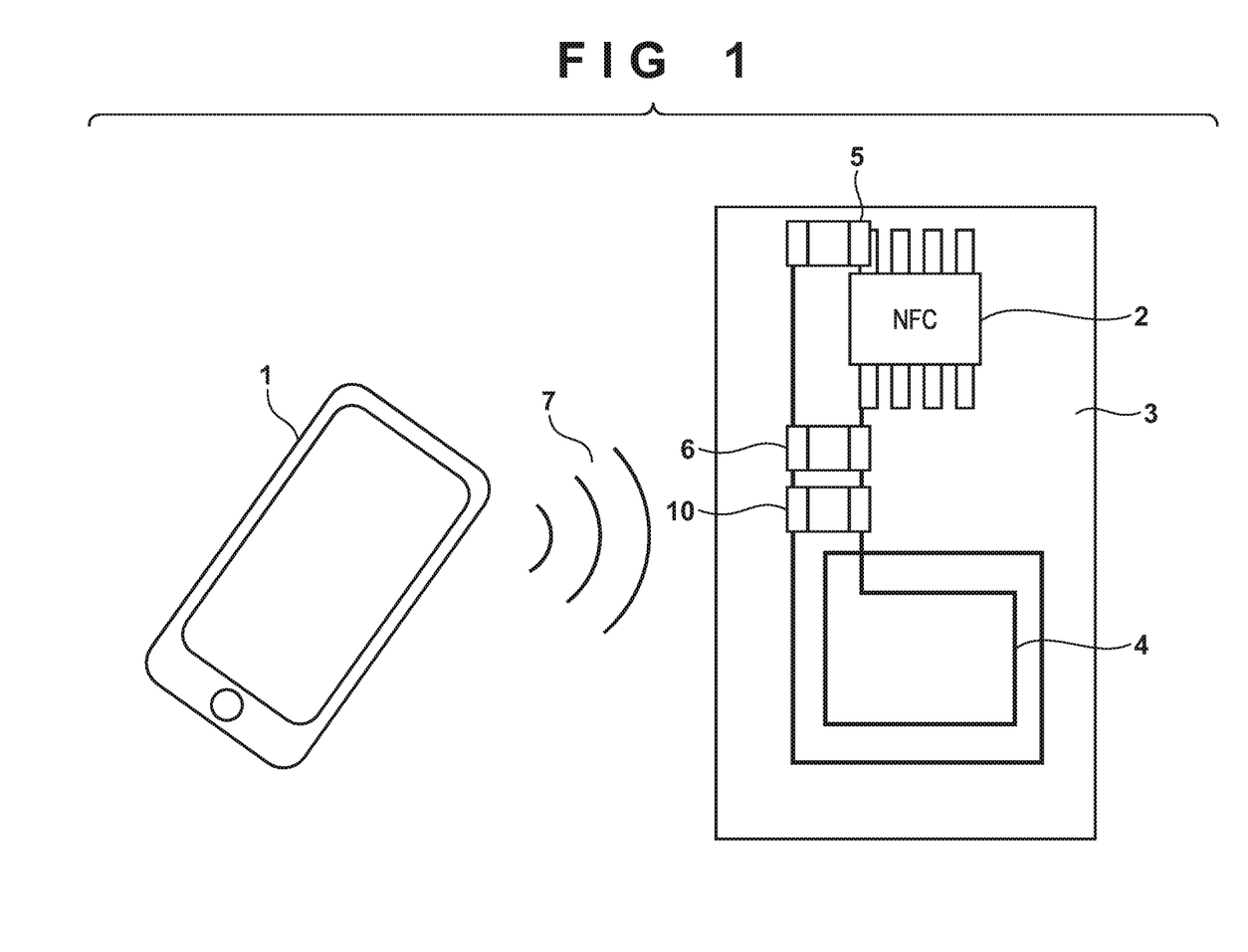
FIG. 1 is a view showing a network arrangement using NFC communication between a mobile terminal and an MFP.

FIG. 1 is a view showing a network arrangement using NFC communication between a mobile terminal and an MFP according to an exemplary embodiment of the present invention.

As shown in FIG. 1, an antenna pattern 4 embedded in an NFC PWB (Printed Wiring Board) 3 receives an RF signal 7 output from the NFC R/W of a mobile terminal 1, and performs analog-to-digital conversion (to be referred to as A/D conversion hereinafter) for the received signal in the chip of an NFC IC 2, thereby receiving communication information. The NFC PWB 3 is a short distance wireless communication circuit board integrated in the MFP.

Depending on the specification of the NFC R/W of the mobile terminal 1, power (peak voltage: Vp-p) generated in the antenna pattern 4 may exceed that defined by the NFC standard. Therefore, an element for decreasing the voltage is inserted into the antenna pattern 4 to decrease the voltage peak value applied to the NFC IC 2, thereby protecting the NFC IC 2. Examples of the element for decreasing the voltage are a resistor 5 and a diode (LED) 6. If a DC voltage is applied, a forward drop voltage Vf is generated between elements, and thus the diode (LED) 6 serving as a light emission element can decrease the peak voltage generated in the antenna pattern 4 by the forward drop voltage Vf.

Since the NFC RF signal is an AC waveform signal, the voltage drop amount of the peak voltage of the diode (LED) 6 corresponds to a current amount flowing through the diode (LED) 6. At this time, by connecting a capacitor 10 in parallel with the diode (LED) 6, a function of the capacitor 10 for causing an AC current to flow allows the received RF signal to be supplied to the NFC IC 2 as a full wave signal without any influence of rectification of the diode (LED) 6.

Power supplied by a magnetic field generated by the NFC R/W of the mobile terminal 1 is larger as the distance to the antenna pattern 4 is shorter.

As shown in FIG. 1, in this embodiment, the diode (LED) 6 is connected to the antenna pattern 4. Thus, when the NFC R/W is close to the antenna pattern 4 at a distance at which power for turning on the diode (LED) 6 can be supplied by the magnetic field generated by the NFC R/W, the diode (LED) 6 is turned on. When the diode (LED) 6 is ON, the user can visually confirm that the antenna pattern 4 is close to the mobile terminal 1.

Furthermore, since the peak voltage (Vp-p) generated in the antenna pattern 4 changes in accordance with the distance between the NFC R/W and the antenna pattern 4, the distance to the NFC R/W can be visually confirmed by the lighting intensity of the diode (LED) 6. To the contrary, when the diode (LED) 6 is OFF, it is possible to visually confirm that the distance between the NFC R/W and the antenna pattern 4 is out of an NFC communicable range.

Figure 2:
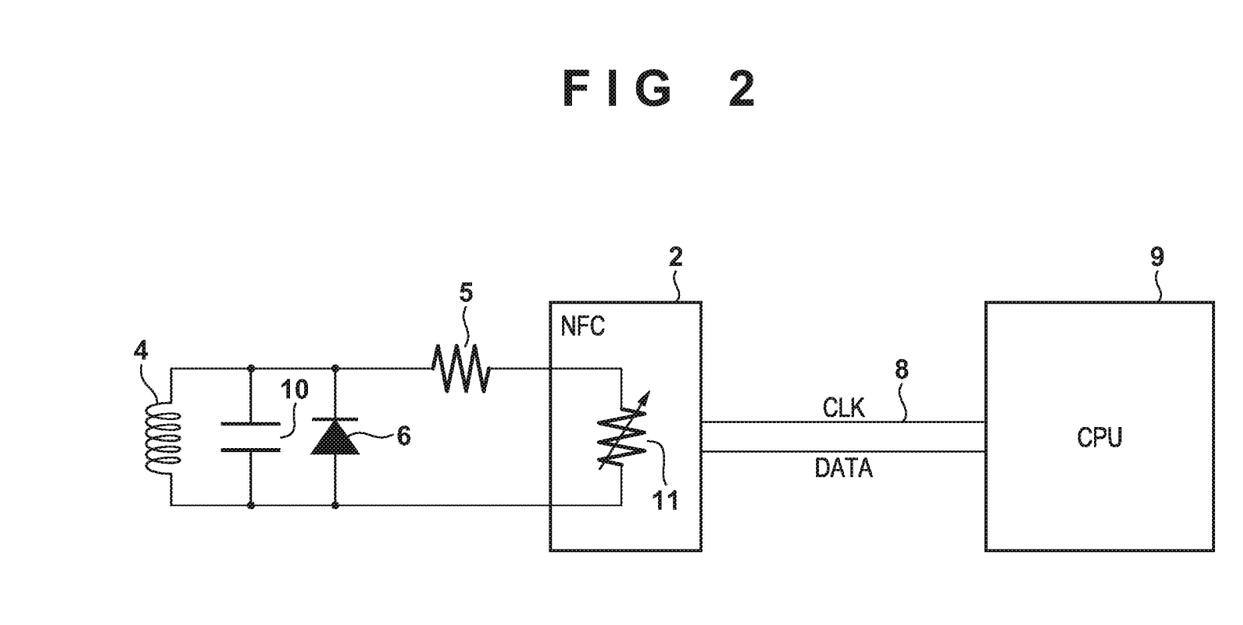
FIG. 2 is a circuit diagram showing the basic arrangement of an NFC communication circuit integrated in the MFP.

FIG. 2 is a circuit diagram showing the basic arrangement of an NFC communication circuit integrated in the MFP.

As shown in FIG. 2, the NFC IC 2 and a CPU 9 communicate with each other via a communication line 8 using a communication method such as SPI or I2C, and thus the CPU 9 transmits/receives data to/from the NFC IC 2. This transmission/reception operation is implemented by transmitting/receiving a data signal (DATA) in synchronism with a clock signal (CLK). The capacitor 10 is connected to adjust the resonant frequency of the antenna pattern 4 to any desired frequency. As described above, the capacitor 10 supplies the received RF signal as a full wave signal to the NFC IC 2 by the function of causing an AC current to flow. In addition, a variable resistor 11 is integrated in the NFC IC 2.

As shown in FIG. 2, by integrating the variable resistor 11 in the NFC IC 2, the peak voltage (Vp-p) generated in the antenna pattern 4 is dropped in the NFC IC 2. This decreases the voltage applied to the internal logic circuit of the NFC IC 2, thereby protecting the NFC IC 2. Since it is thus possible to obtain the same effect as that in a case where the element for decreasing the voltage is inserted into the antenna pattern 4, the NFC IC 2 is protected by decreasing the peak voltage applied to the internal logic circuit of the NFC IC 2.

Furthermore, by setting, as a protection target element, the variable resistor 11 integrated in the NFC IC 2, it is possible to change a resistance value by resistor setting of the NFC IC 2 to adjust the voltage drop amount of the peak voltage Vp-p while adjusting the voltage signal intensity so as not to influence NFC communication with the mobile terminal 1.

Figure 3:
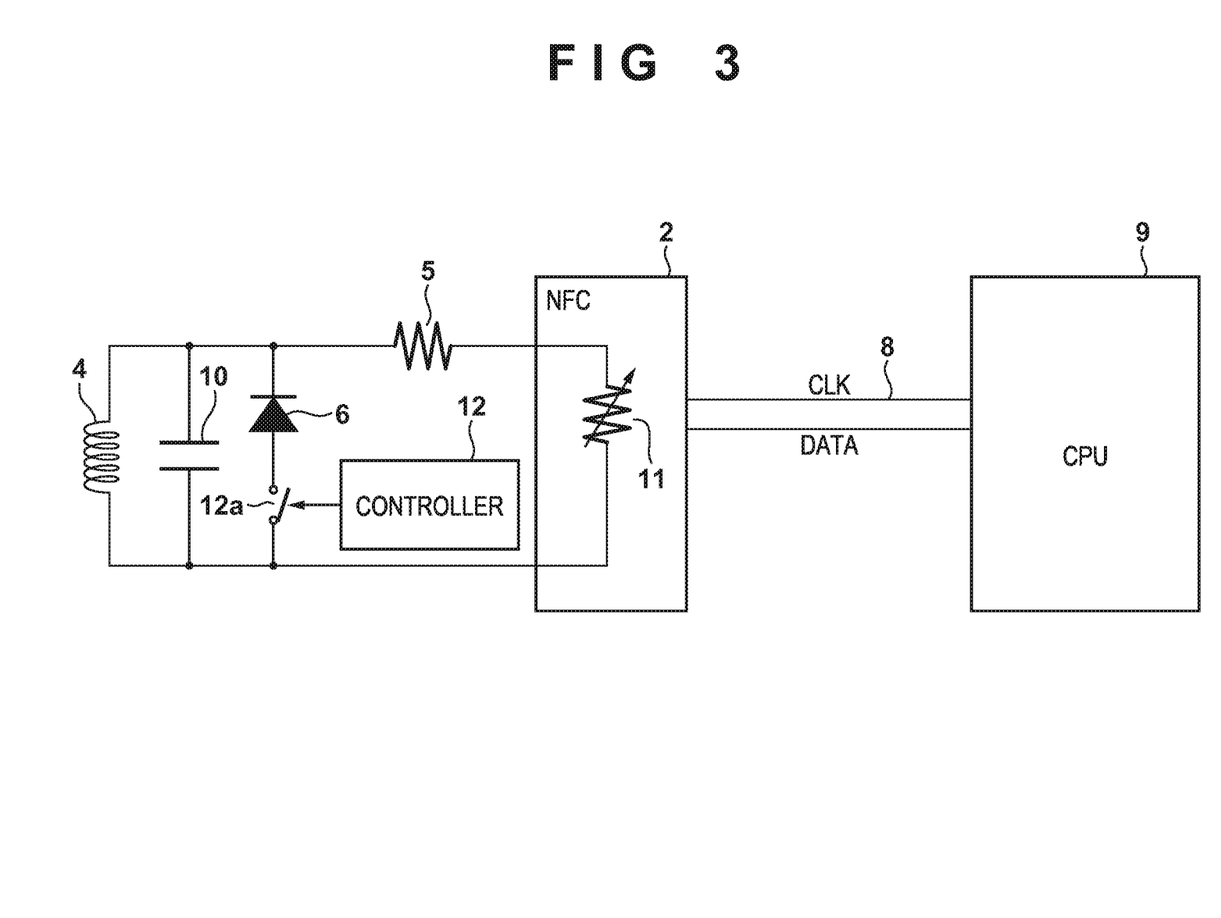
FIG. 3 is a circuit diagram showing an arrangement in which a controller for intermittently turning on an LED is added to the NFC communication circuit shown in FIG. 2.

FIG. 3 is a circuit diagram showing an arrangement in which a controller for intermittently turning on the LED is added to the NFC communication circuit shown in FIG. 2. Note that in FIG. 3, the same components as those described with reference to FIG. 2 are denoted by the same reference numerals and a description thereof will be omitted.

Power consumed when the diode (LED) 6 is turned on drops the peak voltage generated in the antenna pattern 4, which may decrease the NFC communication range. To cope with this, the controller 12 that intermittently turns on the LED 6 so that the LED 6 looks always ON for the human eyes is integrated, thereby making it possible to adjust a current flowing into the LED 6. A setting value may be set, in a controller 12, as an interval at which the LED 6 is intermittently turned on, or a lighting interval may be set based on the peak voltage generated in the antenna pattern 4 and applied to the diode (LED) 6.

In the arrangement shown in FIG. 3, the controller 12 controls a switch 12a series-connected to the LED 6. However, the controller 12 may be series-connected to the LED 6 to intermittently turn on the LED 6.

In either case, since a voltage drop amount can be adjusted by the lighting interval at which the LED 6 is intermittently turned on, it is possible to perform adjustment so the voltage drop amount of the peak voltage generated in the antenna pattern 4 does not influence NFC communication. The controller 12 may be integrated in the NFC IC 2 or the CPU 9. As the lighting interval, any desired value set in the controller 12 can be set.

Figure 4:
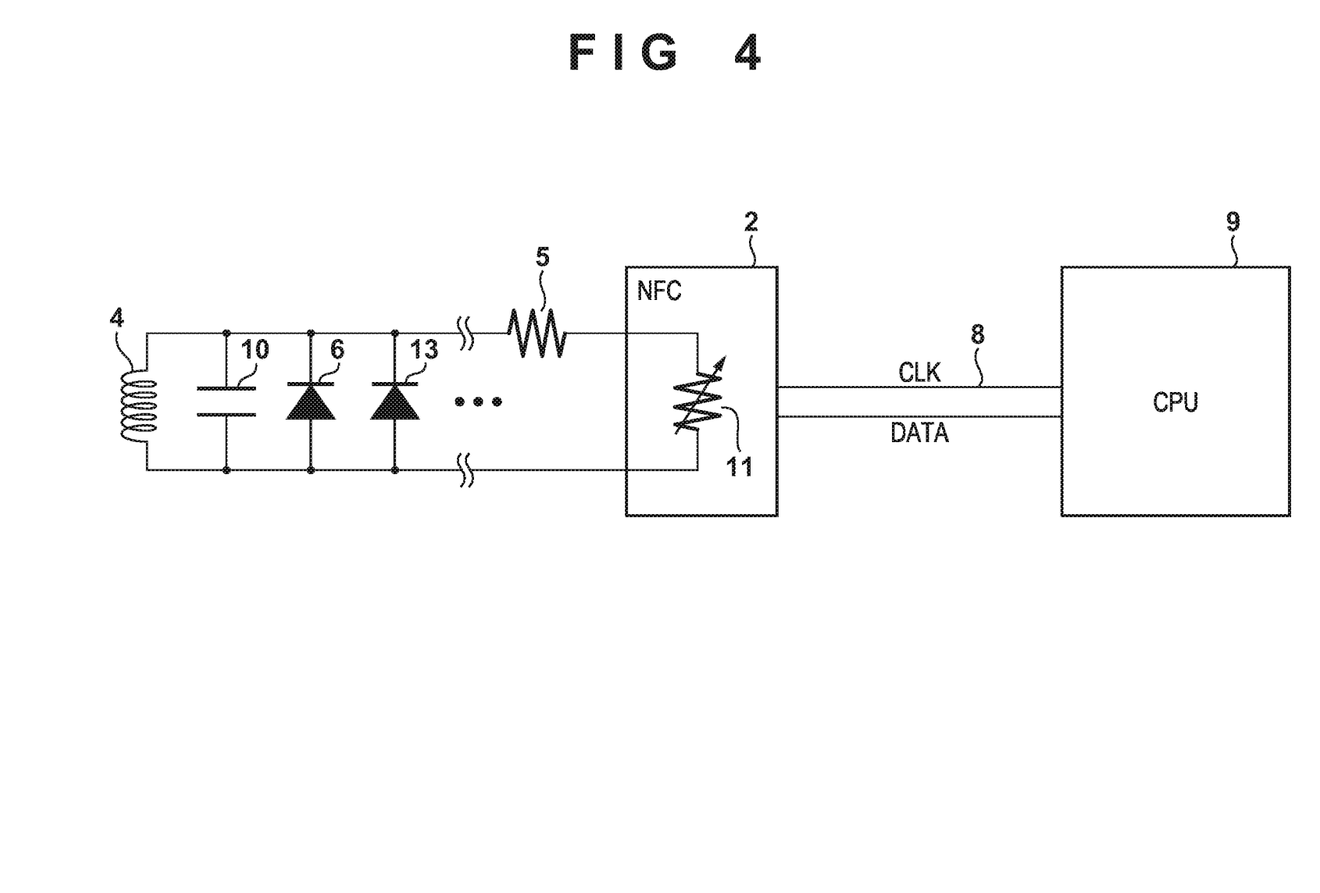
FIG. 4 is a circuit diagram showing an arrangement in which a plurality of LEDs are parallel-connected to the NFC communication circuit shown in FIG. 2.

FIG. 4 is a circuit diagram showing an arrangement in which a plurality of LEDs are parallel-connected to the NFC communication circuit shown in FIG. 2.

As shown in FIG. 4, if a plurality of LEDs such as the LED 6 and an LED 13 are parallel-connected, a current value flowing into the LEDs 6 and 13 becomes large, and thus the voltage drop amount of the peak voltage Vp-p generated in the antenna pattern 4 becomes larger than that in a case where the one LED 6 is integrated. Therefore, the protection function for the NFC IC 2 is improved, as compared with a case in which one LED is integrated. Note that the LEDs 6 and 13 may be parallel-connected to the antenna pattern 4 regardless of the forward direction of the LEDs.

If an LED is used as an element for decreasing the voltage, as described above, the LED is turned on by induced power generated in the antenna pattern by a magnetic field generated by an RF signal from the NFC R/W. When the LED is turned on, it is possible to visually recognize that the NFC R/W is close to the antenna pattern 4. In addition, since the distance between the antenna pattern and the NFC R/W, and the magnetic field intensity generated by the NFC R/W can be visually recognized by the lighting intensity of the LED, the NFC communicable range can be recognized by lighting of the LED.

In addition, if LEDs that emit light beams of different colors are integrated, an RF magnetic field recognizable range, an RF communicable range, and the like can be determined in accordance with the colors.

Figure 5:
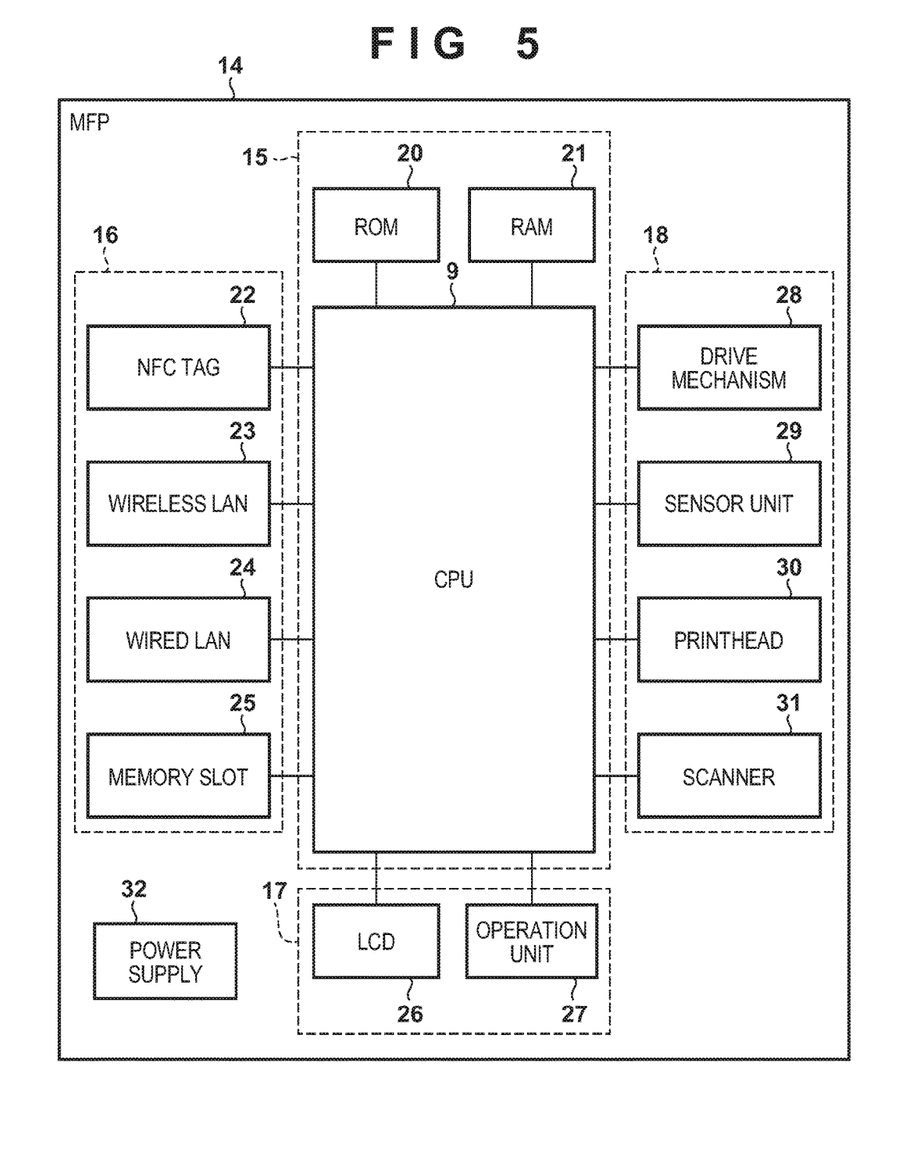
FIG. 5 is a block diagram showing the control arrangement of the MFP integrating one of the NFC communication circuits shown in FIGS. 2 to 4.

FIG. 5 is a block diagram showing the control arrangement of the MFP integrating one of the NFC communication circuits shown in FIGS. 2 to 4.

As shown in FIG. 5, an MFP 14 is mainly formed by a system controller 15, an interface unit 16, a user interface unit 17, a mechatronics & sensor unit 18, and a power supply 32.

The system controller 15 is formed by the CPU 9, a ROM 20, and a RAM 21, and controls the overall MFP. The interface unit 16 includes interfaces with external devices and a memory, such as an NFC tag 22, a wireless LAN 23, a wired LAN 24, and a memory slot 25. The user interface unit 17 includes a display such as an LCD 26 and an operation unit 27 formed by a switch, a touch panel, and the like. The above-described NFC IC 2 is integrated in the NFC tag 22.

The mechatronics & sensor unit 18 includes a drive mechanism 28 such as a motor that conveys a print medium and reciprocally moves a carriage, a sensor unit 29 that monitors the behavior of the drive mechanism 28, a printhead 30, and a scanner 31. The printhead 30 prints by discharging ink to the print medium by, for example, an inkjet method, and the scanner 31 optically reads an image of an original placed on a platen glass.

The power supply 32 is connected to the respective blocks to supply power although connection lines to the respective blocks are not shown in FIG. 5 for the sake of simplicity.

Note that the MFP is exemplified as a typical example of an apparatus that performs NFC communication with the mobile terminal 1. However, the present invention is not limited to this, and an information processing apparatus other than the MFP may be used. As the information processing apparatus, an electric device such as a digital camera or a personal computer (PC) may be used.

Figure 6:
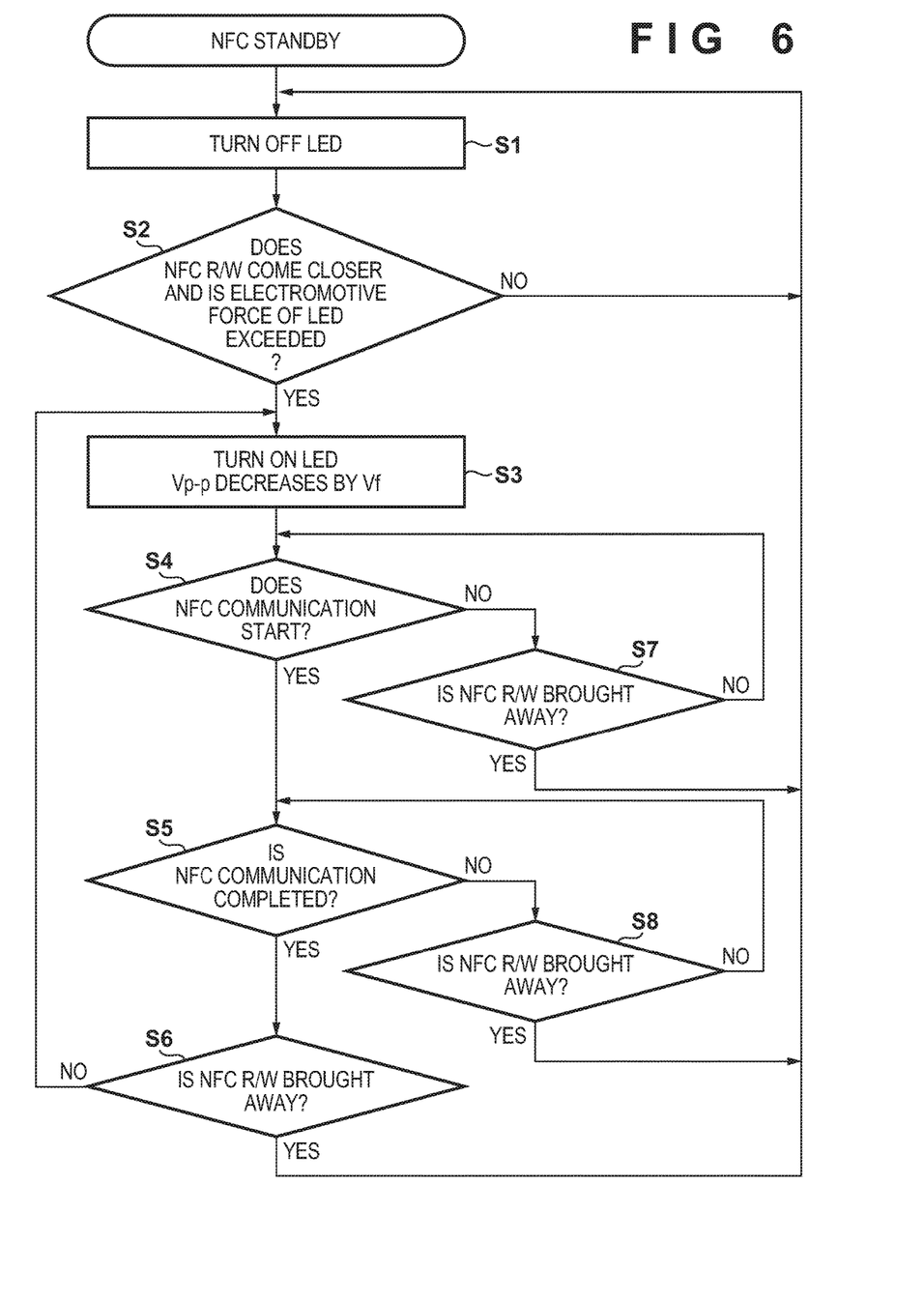
FIG. 6 is a flowchart illustrating the lighting control operation of the LED connected to an antenna pattern when performing NFC communication.

FIG. 6 is a flowchart illustrating the lighting control operation of the LED connected to the antenna pattern when performing NFC communication.

First, assume that the MFP 14 is in an NFC standby state in which no NFC communication with the mobile terminal 1 is performed. In step S1, in the NFC standby state, the diode (LED) 6 is in an OFF state. If the NFC R/W (that is, the mobile terminal 1) comes closer, an RF magnetic field is generated, thereby generating the voltage Vp-p in the antenna pattern 4.

In step S2, lighting of the diode (LED) 6 is controlled in accordance with whether the voltage Vp-p exceeds the electromotive force of the diode (LED) 6. That is, if the voltage Vp-p exceeds the electromotive force of the diode (LED) 6, the diode (LED) 6 is turned on in step S3. As described above, since the variable resistor 11 is integrated in the NFC IC 2, the peak voltage (Vp-p) drops in the NFC IC 2 to decrease the voltage applied to the internal logic circuit of the NFC IC 2, thereby protecting the NFC IC 2. On the other hand, if the voltage Vp-p is equal to or lower than the electromotive force of the diode (LED) 6, the OFF state of the diode (LED) 6 is maintained in step S1.

If the NFC R/W (that is, the mobile terminal 1) comes closer, the distance between the mobile terminal 1 and the MFP 14 falls within the NFC communicable range.

Therefore, in step S4, an NFC communication start is controlled in accordance with the distance (L) between the mobile terminal 1 and the MFP 14. That is, if the distance (L) between the mobile terminal 1 and the MFP 14 reaches the NFC communicable range (Lcom) to start NFC communication, NFC communication completion is monitored in step S5. On the other hand, if no NFC communication starts, the NFC communication start and LED lighting are controlled in step S7 before the distance (L) between the NFC R/W (that is, the mobile terminal 1) and the MFP 14 reaches the communicable range (Lcom).

In other words, in accordance with whether the distance (L) is longer, that is, if L>Lcom or the mobile terminal 1 is brought away from the MFP 14, the diode (LED) 6 is set in the OFF state in step S1 to return to the NFC standby state. On the other hand, if L≤Lcom or the distance between the mobile terminal 1 and the MFP 14 is maintained within the NFC communicable range, the NFC communication start is continuously monitored in step S4.

In step S5, NFC communication completion is monitored. If NFC communication is continuously executed, NFC communication completion and LED lighting are controlled in step S8 in accordance with whether the distance (L) is longer.

That is, if L>Lcom and the mobile terminal 1 is brought away from the MFP 14, the diode (LED) 6 is set in the OFF state in step S1 to return to the NFC standby state. On the other hand, if L≤Lcom or the distance between the mobile terminal 1 and the MFP 14 is maintained within the NFC communicable range, NFC communication completion is continuously monitored in step S5. If NFC communication completion is confirmed in step S5, LED lighting is controlled in step S6 in accordance with whether the distance (L) is longer.

That is, if L>Lcom or the mobile terminal 1 is brought away from the MFP 14, the diode (LED) 6 is set in the OFF state in step S1 to return to the NFC standby state. On the other hand, if L≤Lcom or the distance between the mobile terminal 1 and the MFP 14 is maintained within the NFC communicable range, the LED is continuously turned on in step S3.

Consequently, according to the above-described embodiment, lighting of the LED is controlled in accordance with the distance between the mobile terminal and the MFP. In addition, the ON state of the LED is also controlled in accordance with the start/completion of NFC communication. Therefore, the user can confirm the state of NFC communication and the closeness state of the mobile terminal to the MFP from the ON state of the LED of the MFP. When the LED is turned on in accordance with the distance between the mobile terminal and the MFP, the voltage applied to the internal logic circuit of the NFC IC drops by the variable resistor, thereby making it possible to prevent the NFC IC from being destroyed by an excessive voltage.

Note that the above-described embodiment has explained NFC as an example of short distance wireless communication. However, in addition to NFC, another communication method such as an RFID method can be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237827, filed Dec. 7, 2016, which is hereby incorporated by reference herein in its entirety.

What is claimed is:

1. An electric device for performing short distance wireless communication with a mobile terminal, comprising:
    an antenna configured to generate induced power by an RF signal from the mobile terminal;
    a resistor configured to drop a peak voltage generated by the induced power;
    a circuit driven by the voltage dropped by the resistor and configured to perform the short distance wireless communication; and
    a light emission element driven by the voltage dropped by the resistor and configured to emit light, wherein
    the resistor is series-connected between the circuit and the antenna.

2. The electric device according to claim 1, wherein at least one LED is used as the light emission element, and the at least one LED is parallel-connected between the circuit and the antenna.

3. The electric device according to claim 2, wherein a capacitor is further parallel-connected to the at least one LED.

4. The electric device according to claim 2, further comprising:
    a switch configured to turn on and off the at least one LED; and
    a controller configured to intermittently turn on the at least one LED by controlling an operation of the switch.

5. The electric device according to claim 4, wherein an interval at which the at least one LED is intermittently turned on is set in the controller.

6. The electric device according to claim 2, wherein the at least one LED comprises a plurality of LEDs that are parallel-connected between the circuit and the antenna.

7. The electric device according to claim 2, wherein the at least one LED is turned on in accordance with a distance between the mobile terminal and the electric device, and lighting intensity of the at least one LED changes in accordance with the distance.

8. The electric device according to claim 7, wherein if the distance between the mobile terminal and the electric device is out of a communicable range, the at least one LED is turned off.

9. The electric device according to claim 1, wherein the circuit integrates a variable resistor that drops the peak voltage.

10. The electric device according to claim 1, wherein the short distance wireless communication includes NFC.

11. The electric device according to claim 1, wherein the electric device includes one of a printing apparatus, a digital camera, and a personal computer.

12. The electric device according to claim 1, wherein the mobile terminal includes one of a smartphone and a tablet terminal.

13. An operation method for an electric device including a circuit configured to perform short distance wireless communication with a mobile terminal, comprising:
    receiving, by an antenna, an RF signal from the mobile terminal, wherein induced power is generated by the RF signal from the mobile terminal;
    dropping, by a resistor integrated in the electric device, a peak voltage generated by induced power generated in the antenna;
    driving the circuit by the voltage dropped by the resistor to perform the short distance wireless communication; and
    driving a light emission element by the voltage dropped by the resistor to emit light, wherein
    the resistor is series-connected between the circuit and the antenna.

14. The method according to claim 13, wherein
    at least one LED is used as the light emission element, and
    the at least one LED is parallel-connected between the circuit and the antenna.

15. The method according to claim 14, wherein the at least one LED is turned on in accordance with a distance between the mobile terminal and the electric device, and lighting intensity of the at least one LED changes in accordance with the distance.

16. The method according to claim 15, wherein if the distance between the mobile terminal and the electric device is out of a communicable range, the at least one LED is turned off.

* * * * *